United States Patent
Iyer et al.

(10) Patent No.: US 6,938,179 B2
(45) Date of Patent: Aug. 30, 2005

(54) SOCKET EXTENSIONS FOR REDUNDANCY

(75) Inventors: Sreeram P. Iyer, Sunnyvale, CA (US); Atul Mahamuni, San Jose, CA (US)

(73) Assignee: Nokia Corporation, Espoo (FI)

( * ) Notice: Subject to any disclaimer, the term of this patent is extended or adjusted under 35 U.S.C. 154(b) by 74 days.

(21) Appl. No.: 10/286,350

(22) Filed: Nov. 1, 2002

(65) Prior Publication Data

US 2004/0088418 A1 May 6, 2004

(51) Int. Cl.$^7$ .............................................. G06F 11/00
(52) U.S. Cl. ........................ 714/4; 709/227; 709/237; 709/238
(58) Field of Search .................... 714/4; 709/227, 709/237–238

(56) References Cited

U.S. PATENT DOCUMENTS

| | | | | |
|---|---|---|---|---|
| 4,975,914 A | * | 12/1990 | Ashton et al. .................. 714/4 |
| 5,754,752 A | * | 5/1998 | Sheh et al. ..................... 714/4 |
| 6,003,084 A | * | 12/1999 | Green et al. ................. 709/227 |
| 6,377,996 B1 | * | 4/2002 | Lumelsky et al. ........... 709/231 |
| 6,697,824 B1 | * | 2/2004 | Bowman-Amuah ......... 709/229 |
| 6,700,868 B2 | * | 3/2004 | Smith et al. ................. 370/217 |

OTHER PUBLICATIONS

TCP/IP Illustrated vols. 1–3; W. Richard Stevens, Gary R. Wright, Published Nov. 2001; vol. 1—Chapters 3,11, 17, 18, 19, 20, 21; vol. 2—Chapters 8, 15, 16, 17, 22, 23, 24, 25, 26, 27, 28, 29, 30, 32.

* cited by examiner

*Primary Examiner*—Robert Beausoliel
*Assistant Examiner*—Emerson Puente
(74) *Attorney, Agent, or Firm*—Darby & Darby P.C.

(57) ABSTRACT

A standard socket interface is provided to implement socket redundancy. The interface includes socket options to create redundant sockets, obtain the status of redundant sockets, as well as providing error information relating to redundant sockets. A redundant socket may be created on a standby side that becomes active should the active side fail. The standby socket is associated with the active side socket. When an active side fails that has a redundant socket created, the standby side socket seamlessly takes over the sockets operations.

10 Claims, 5 Drawing Sheets

SOCKET EXTENSIONS FOR REDUNDANCY

FIELD OF THE INVENTION

The present invention relates to IP networks, and more particularly to socket redundancy.

BACKGROUND OF THE INVENTION

The Berkeley Software Distribution (BSD) socket interface has become a de-facto standard network programming interface used to implement Transmission Control Protocol (TCP)/User Datagram Protocol (UDP) based applications. These socket based applications have become essential in today's networking environment. As a result, a network element should be able to handle the situation when one of its processing elements fails and thus, the connections fail.

As a result of the importance of networking, the resiliency of networks has become quite important in the current networking world so as to keep the downtime of routing devices and hosts minimal. A problem, however, is that when a routing device is not operating correctly, or has failed, it can cause instability in a network.

Protocols like Border Gateway Protocol (BGP), LDP, etc. run over TCP. The breakdown and re-establishment of a BGP session and the convergence can take a few minutes, and this creates instability in the whole Internet. Hence it is extremely important that the sessions never go down due to a single-point failure in a network element.

The BSD socket API, however, does not provide an interface for applications to implement socket redundancy. What is needed is a way for the BSD socket interface to provide a mechanism for applications to perform redundancy operations.

SUMMARY OF THE INVENTION

The present invention is directed at addressing the above-mentioned shortcomings, disadvantages and problems, and will be understood by reading and studying the following specification.

According to one aspect of the invention, a standard interface is provided to implement socket redundancy. The interface includes socket options to create redundant sockets, obtain the status of redundant sockets, as well as providing error information relating to redundant sockets.

According to yet another aspect of the invention an application sets a redundant socket option that instructs a redundant socket to be created as a standby to the active socket. A unique identifier is sent to the standby side that is used to link the standby socket with the active socket.

According to yet another aspect of the invention, when a routing device fails, the redundant (standby) side seamlessly takes over the socket operations.

According to yet another aspect of the invention, the standard socket redundant interface may be applied to any family of sockets, though the examples cover only TCP/UDP.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a network element, such as a client, server, routing device, and the like. The term "flow" means a flow of packets. The term "socket library" refers to the socket API code that is executed in the context of the application. The term "socket layer" refers to the socket backend. The term "active node" is the node that is active and processing packets. The term "standby node" is a node that is redundant to the active node. The term "switchover" refers to the situation when the "active node" fails, and the "standby node" takes over.

The term support node refers to both "GGSN" and "SGSN" nodes. The term "user" refers to any person or customer such as a business or organization that employs a mobile device to communicate or access resources over a mobile network. The term "operator" refers to any technician or organization that maintains or services an IP based network. Referring to the drawings, like numbers indicate like parts throughout the views. Additionally, a reference to the singular includes a reference to the plural unless otherwise stated or is inconsistent with the disclosure herein.

For purposes of discussion, a redundant socket application is assumed to be redundancy-aware, and has the capability to exchange messages between an active node and a standby node. Additionally, the discussion herein assumes a message-based interaction between the socket library and the socket layer. The mechanism, however, can also be applied to a system-call based approach as well.

The redundancy may be applied to any family of sockets, though the examples cover only TCP/UDP.

Briefly described, the present invention is directed at providing an interface for applications to implement socket redundancy. An application may set socket options such that a redundant socket is opened.

Illustrative Operating Environment

Figure 1:
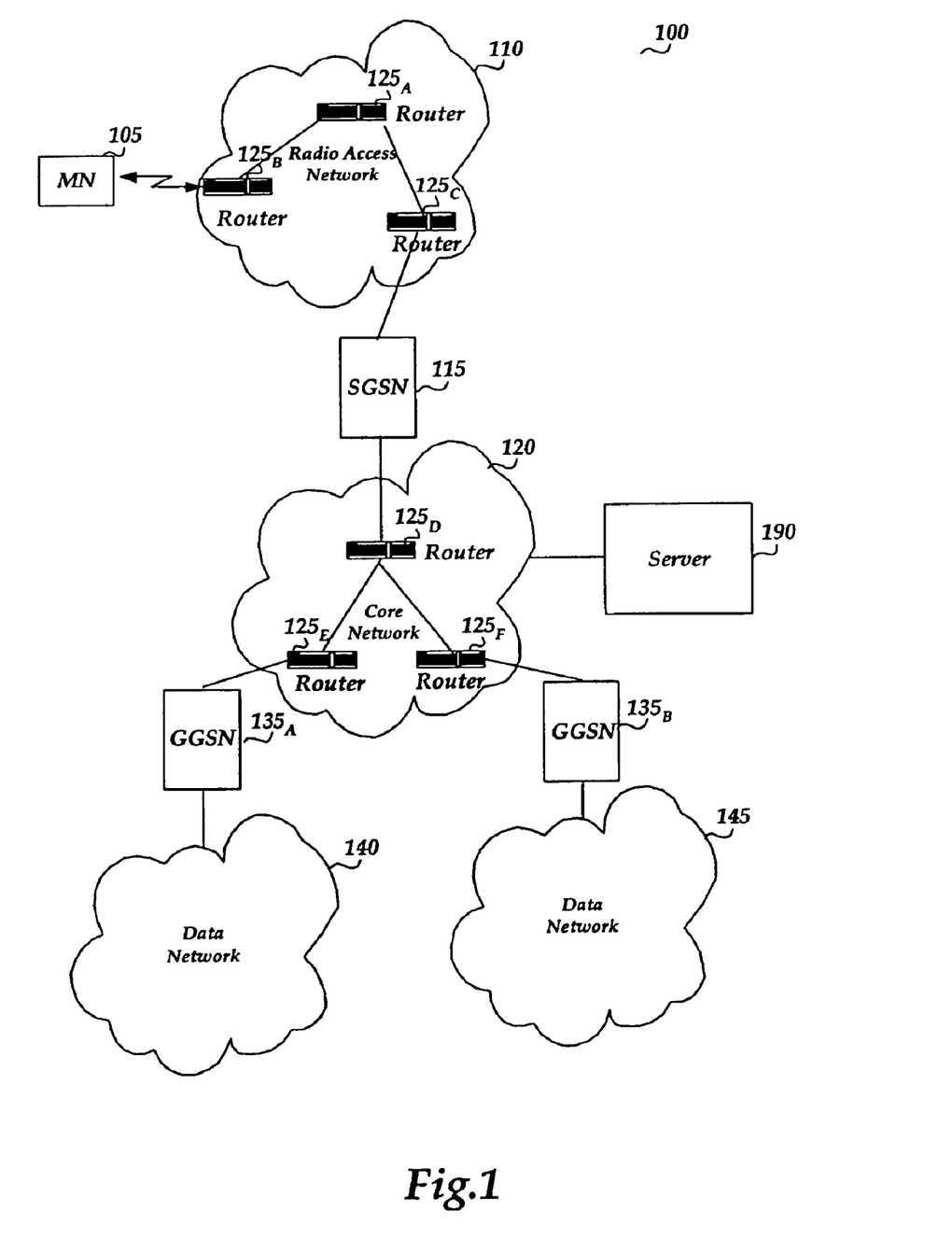
FIG. 1 illustrates an exemplary IP network in which the invention may operate.

With reference to FIG. 1, an exemplary mobile IP network in which the invention may operate is illustrated. As shown in the figure, mobile IP network 100 includes mobile node (MN) 105, radio access network (RAN) 110, SGSN 115, core network 120, routers $125_{A-F}$, server 190, GGSNs $135_{A-B}$, data network 140, and data network 145.

The connections and operation for mobile IP network 100 will now be described. MN 105 is coupled to radio access network (RAN) 110. Generally, MN 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. MN 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio Access Network (RAN) 110 manages the radio resources and provides the user with a mechanism to access core network 120. Radio access network 110 transports information to and from devices capable of wireless communication, such as MS 105. Radio access network 110 may include both wireless and wired components. For example, radio access network 110 may include a cellular tower that is linked to a wired telephone network. Typically, the cellular tower carries communication to and from cell phones, pagers, and other wireless devices, and the wired telephone network carries communication to regular phones, long-distance communication links, and the like. As shown in the figure, RAN 110 includes routers $125_{A-C}$. According to one embodiment of the invention, routers $125_{A-F}$ include redundant routing cores that may provide socket redundancy. Server 190, or some other dedicated network element, may be used to provide Quality of Service (QoS) rules, or some other rules, relating to how the routers process the packets. Briefly described, server 190 may be used to monitor and aid in providing the appropriate behavior model for packet processing within the routers for IP based networks. According to one embodiment, each router may inform the server of information relating to its operation and receive information from the server to set the parameters appropriately.

Some nodes may be General Packet Radio Service (GPRS) nodes. For example, Serving GPRS Support Node (SGSN) 115 may send and receive data from mobile nodes, such as MN 105, over RAN 110. SGSN 115 also maintains location information relating to MN 105. SGSN 115 communicates between MN 105 and Gateway GPRS Support Node (GGSN)s $135_{A-B}$ through core network 120. According to one embodiment of the invention, policy server 190 communicates with RAN 110 and core network 120.

Core network 120 is an IP packet based backbone network that includes routers, such as routers $125_{D-F}$, to connect the support nodes in the network. Routers are intermediary devices on a communications network that expedite message delivery. On a single network linking many computers through a mesh of possible connections, a router receives transmitted messages and forwards them to their correct destinations over available routes. Routers may be a simple computing device or a complex computing device. For example, a router may be a computer including memory, processors, and network interface units.

GGSNs $135_{A-B}$ are coupled to core network 120 through routers $125_{A-C}$ and act as wireless gateways to data networks, such as network 140 and network 145. Networks 140 and 145 may be the public Internet or a private data network. GGSNs $135_{A-B}$ allow MS 105 to access network 140 and network 145.

The operator may set QoS rules to determine whether or not to accept a packet based on different service classes for a particular user or group of users. For example, conversational traffic from user group A may be carried using standard AF/EF behavior, whereas conversational traffic from user group B may be carried with DSUI behavior. The specific user of MN 105 may be differentiated into one of these user groups by an identifier associated with the user. For example, the identifier may be the user Mobile Station Integrated Services Digital Network (MSISDN) number that is known to both the SGSN and the GGSN support nodes.

Server 190 is coupled to core network 120 through communication mediums. Server 190 may be programmed by an operator with rules to manage the 3GPP quality-of-service (QoS) to IP QoS mapping for mobile IP network 100. More specifically, an operator may generate the rules that are used by the nodes on mobile IP network 100 to help ensure end-to-end QoS. These rules may be supplied to the nodes by server 190. Furthermore, computers, and other related electronic devices may be connected to network 140 and network 145. The public Internet itself may be formed from a vast number of such interconnected networks, computers, and routers. Mobile IP network 100 may include many more components than those shown in FIG. 1. However, the components shown are sufficient to disclose an illustrative embodiment for practicing the present invention.

The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
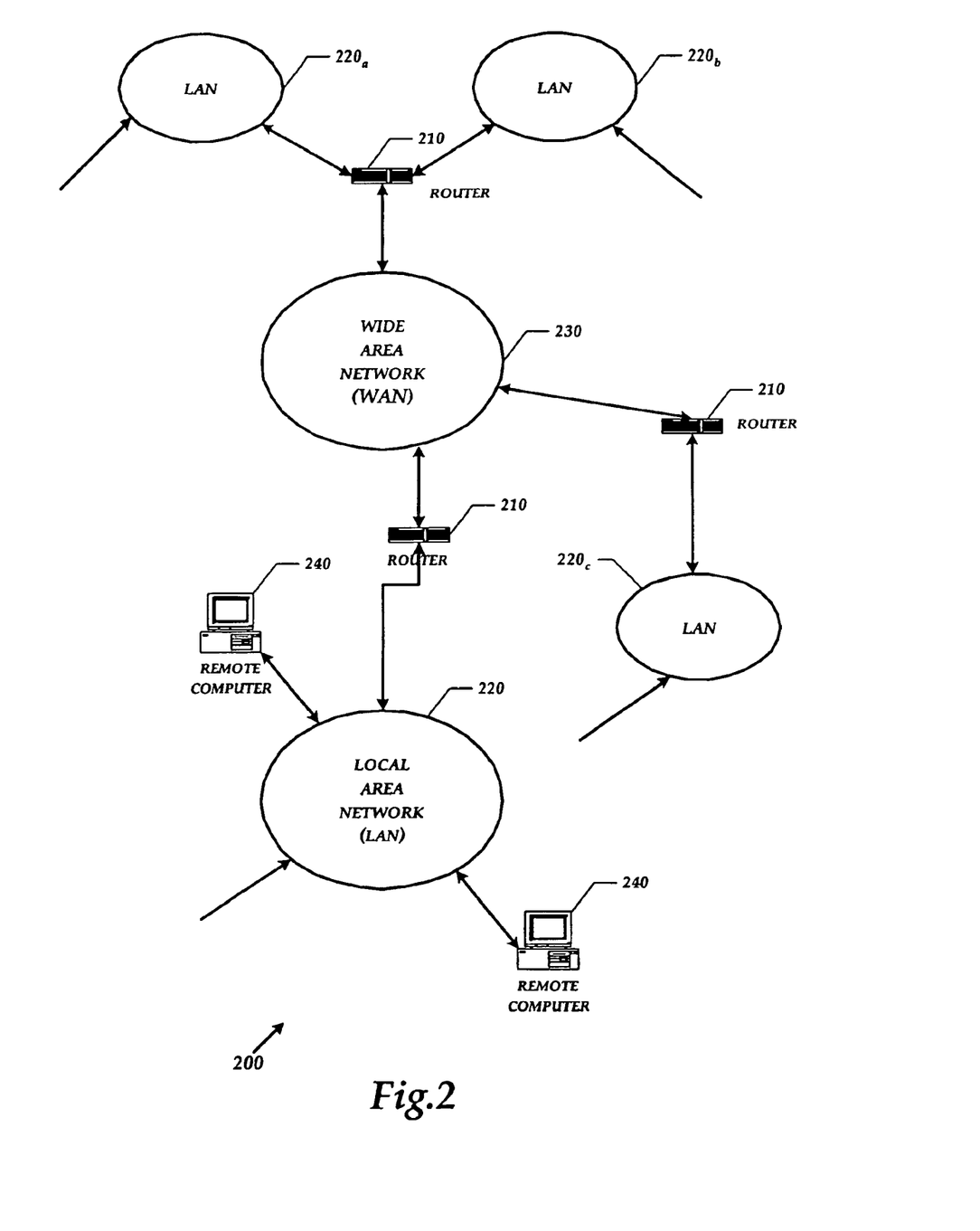
FIG. 2 shows a schematic diagram that illustrates an exemplary system overview in which local area networks and a wide area network are interconnected by routing devices.

FIG. 2 shows another exemplary system in which the invention operates in which a number of local area networks ("LANs") $220_{a-d}$ and wide area network ("WAN") 230 interconnected by routers 210. On an interconnected set of LANs—including those based on differing architectures and protocols—, a router acts as a link between LANs, enabling messages to be sent from one to another.

Routers 210 are configured such that they include multiple routing cores to support redundant socket control.

Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links. Furthermore, computers, such as remote computer 240, and other related electronic devices can be remotely connected to either LANs $220_{a-d}$ or WAN 230 via a modem and temporary telephone link. The number of WANs, LANs, and routers in FIG. 2 may be increased or decreased without departing from the spirit or scope of this invention. As such, the Internet itself may be formed from a vast number of such interconnected networks, computers, and routers and that an embodiment of the invention could be practiced over the Internet without departing from the spirit and scope of the invention.

Socket Redudancy

Figure 3:
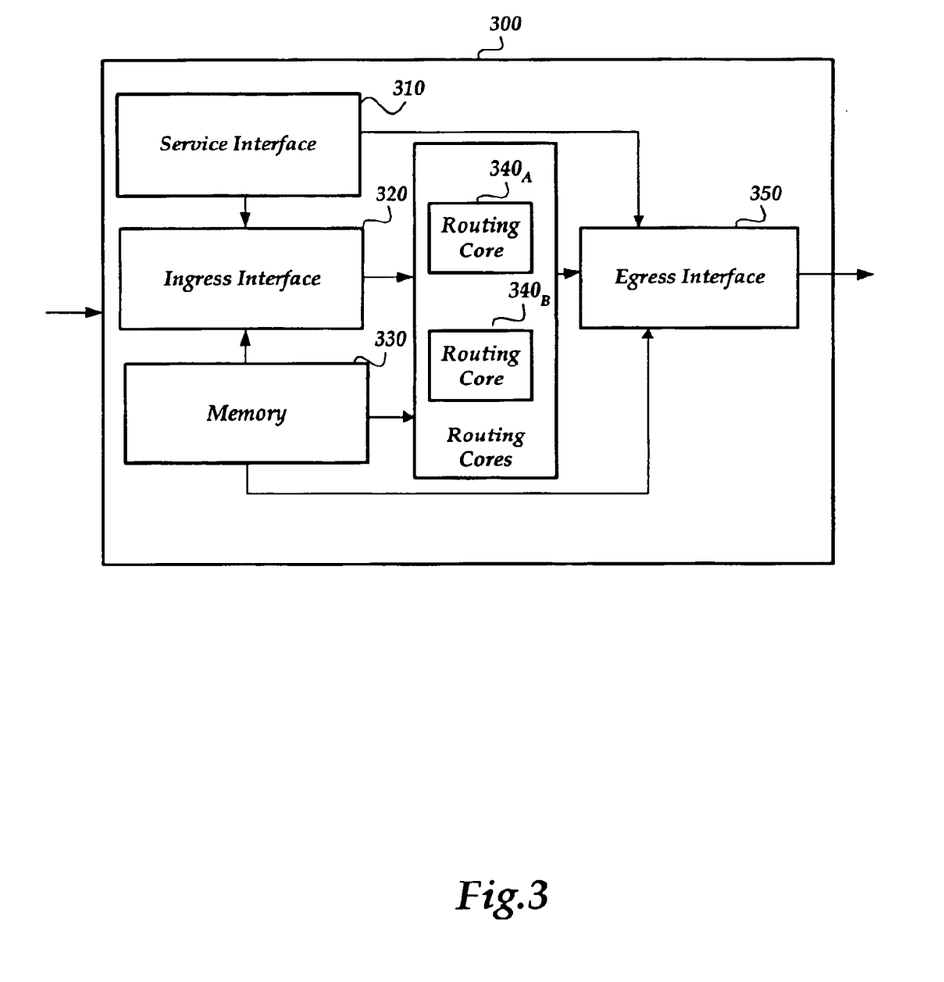
FIG. 3 illustrates an overview block diagram of a routing device.

FIG. 3 illustrates a block diagram of an exemplary routing device in accordance with aspects of the invention. As shown in the figure, router 300 includes service interface 310, ingress interface 320, memory 330, routing cores 340$_{A-B}$, and egress interface 350. Router 300 may include many more components than those shown in FIG. 3. However, the components shown are sufficient to disclose an illustrative embodiment for practicing the present invention.

As illustrated in FIG. 3, router 300 is divided into five blocks. Routing cores 340$_{A-B}$ provides a router's normal routing and switching functionality. One of the functionalities of the routing core is to select the egress interface for data packets entering through the ingress interface. The routing cores moves packets between interfaces according to set policies. The routing cores implement routing protocols and run the software to configure and manage the router. The routing core elements serve as an abstraction of a router's normal routing and switching functionality. Routing core 340$_A$, or routing core 340$_B$, may act as a redundant routing core depending on the routing core that is acting as the primary routing core. For example, if the primary, or active, routing core 340$_A$ fails, redundant routing core 340$_B$ can take over the operation. When socket redundancy is used, routing core 340$_B$ will continue operation, as if routing core 340$_A$ did not fail.

Service interface 310 monitors and provisions operating parameters. For example, monitored parameters may include statistics regarding traffic carried at various service levels. These statistics may be used for accounting purposes and/or for tracking compliance to Traffic Conditioning Specifications (TCSs) negotiated with customers. Provisioned parameters are primarily the TCS parameters for Classifiers and Meters and the associated per-hop behavior (PHB) configuration parameters for actions and queuing elements. The operator, typically through a system administrator, interacts with service interface 310 through one or more management protocols, such as SNMP or COPS protocol, or through other router configuration tools. The operator may interact with service interface 310 through a policy server, a serial terminal, a telnet console, and the like.

Memory 330 is coupled to routing cores 340$_{A-B}$ and may include RAM, ROM, flash or other types of memory, including volatile and non-volatile memory. Memory 330 is used to store the router's application, including its operating system as well as other programs, such as socket redundancy software.

Ingress interface 320, routing cores 340$_{A-B}$ and egress interface 350 are illustrated at the center of the diagram illustrating router 300. In actual router implementations, there may be any number of ingress and egress interfaces interconnected by the routing cores. Additionally, there may be more routing cores.

Ingress interface 320 may provide classification, metering, action, and queuing elements. A packet arriving at ingress interface 320 picks up its policy from a classifier, which selects traffic according to some specification for each traffic class. Typically, a classifier identifies a variety of traffic and breaks it up into separate classes and is parameterized by filters and output streams. Packets from the input stream are sorted into various output streams by filters which match the contents of the packet or possibly match other attributes associated with the packet. The simplest classifier element is one that matches all packets that are applied at its input. In this case, the classifier may be omitted. A classifier may also classify the input streams according to their service class.

Egress interface 350 is arranged to receive data from service interface 310, and routing cores 340$_{A-B}$. Egress interface 350 also includes an output for outputting packets. As mentioned above, many actions may be applied to the packets.

Figure 4:
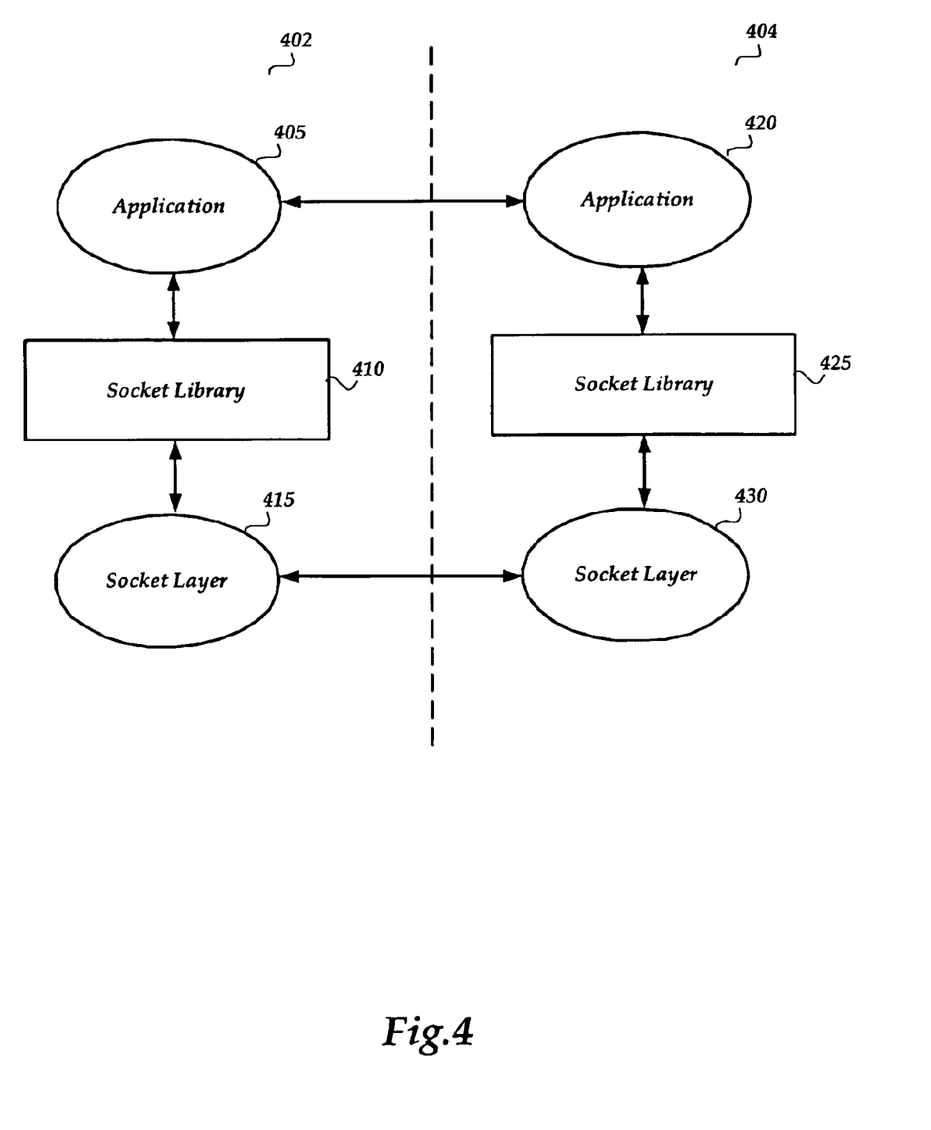
FIG. 4 shows a block diagram of an architecture for socket redundancy.

FIG. 4 illustrates a block diagram of a socket control redundancy architecture and procedure, in accordance with aspects of the invention. As shown in the figure, the socket control redundancy architecture includes a primary side 402 and a standby side 404. Primary side 402 includes application 405, socket library 410, and socket layer 415. Standby, side 404 includes application 420, socket library 425, and socket layer 430.

The operation of an exemplary redundancy procedure will now be described. Application 405 initializes and performs an open socket operation using socket library 410. The application may set many different socket options. According to one embodiment of the invention, the application performs a set socket operation such as (setsockopt(socket-id, SOL_SOCKET, SO_REDUNDANT, (char *) &cookie, sizeof(cookie))) to set the socket to be redundant. This operation requests a redundant socket to be established on redundant (standby) side 404. Socket layer 415 receives the instruction to establish a redundant socket and sends a message with the socket parameters to the standby socket layer 430 to instruct it to create a socket. According to one embodiment of the invention, socket layer 415 includes a "cookie" with the message that uniquely identifies the socket. The message may include other items of information relating to the socket, as well. In response to the message sent by socket layer 415, socket layer 430 creates a socket and associates the cookie with the socket. Socket layer 430 also sends an acknowledgment message (ACK) to socket layer 415.

Socket layer 415 sends a response to application 405 through socket library 410. The response may indicate the status of the requested operation. Application 405 may then request the socket operations from the newly opened socket, such as (getsockopt(socket-id, SOL_SOCKET, SO_REDUNDANT, (char *) &cookie, &cookieSize), in order to obtain the cookie. Application 405 then sends the cookie to standby application 420. Application 420 may then execute a set socket option operation (setsockopt( )) with the socket id and the cookie to complete the association between the socket on the active side (402) with the socket on the standby side (404). The application may call the set socket option operation with a SOCKET-ID-INVALID as an argument wherein the set socket operation call also internally calls socket( ) to create a new socket, before actually performing the set socket option operation. Application 420 may also send an ACK message back to application 405 acknowledging the message.

Once the socket association has been performed successfully, all new socket control operations (listen, bind, setsockopt, ioctl, etc.) are automatically transferred to the standby by the socket layer 415. Data redundancy may also be established, at this stage.

Once the socket is redundant, application 405 need not send any further socket control operations to the standby. Application 405, may, however, send control operations to the standby. If application 405 does send these operations to the standby, then the operations performed by the socket layer 430 on behalf of the Active side override the operations performed by the application 420 on the standby side.

Two possible sources of requests for the socket layer on the standby include: (1) the socket control operation performed by the application 420 on the standby; and (2) the socket control operation performed by the application 405 on the Active, and propagated to the standby 430 by the socket layer 415.

Socket control operation (2) takes precedence and overwrites the parameters in (1), since this socket has been marked as redundant. If the application-message reached the standby after the socket-message, and the parameters are different, an error is returned to the user with ERED (a newly defined error type) as the error (ermo); otherwise the API returns success. Two socket operations (connect and accept) will now be discussed in more detail.

Connect

Connect for UDP and raw sockets is a local operation, and hence the connect operation is handled in the same way as bind, listen, etc. For TCP sockets, when the application 405 invokes connect on the Active side, the TCP state machine is activated and is in progress. There is a connect timeout associated with this connect call. Application 420 may or may not call connect on the standby side (404).

When the application does not invoke connect on the standby (404), then, as soon as the TCP connection is established, this information is sent to the standby socket layer (430) by the active socket layer (415). Data redundancy may also be established with immediate effect.

When the application (420) invokes connect on the standby as well, then the socket layer on the standby (430) performs a dummy wait and keeps the caller blocked. (For non-blocking sockets, EWOULDBLOCK is returned and the application can use select to check if the connection was successful.) There is no timer on the standby (404) for this connect call, since the timeout should be synchronized with the Active node (402). If connect returns successfully, this is sent to the standby by the socket layer 415, and then the application on the standby 420 is woken up by the socket layer on the standby (430). After sending the message to the standby, the user on the Active is woken up with the connect success message. When the connect timeout happens on the Active, the message is sent to the standby by the socket layer 415, and the application 420 is woken up with the ETIMEOUT error. After sending the message to the standby, the application 405 on the Active is woken up with the connect failure message.

If there is a switchover before the connection is established, when the socket layer 430 (on the standby-turned-active side) detects the switchover, the application 420 is woken up with an error, and the error code as ESWITCHOVER. The application 420 calls connect once more to initiate the TCP state machine again.

Accept

The active application 405 opens a listening socket. When the active application enables redundancy on this listening socket, all the socket operations on this socket are also made redundant. Redundancy is automatically enabled on all the new sockets created as a result of new TCP connections now. Even if redundancy is not enabled on the listening socket, the application can choose to enable redundancy only on the child socket, by performing setsockopt as described in the previous sections.

There are two cases for redundant listening sockets: (1) the application does not perform accept on the standby, and (2) the application performs accept on the standby.

In case (1), when the active application 405 receives the response, it calls the getsockopt(SO_REDUNDANT) and obtains a cookie. (The socket layer 415 would already have transferred this information to the socket layer 430, before returning the cookie to 405.) The active application 405 sends the cookie to the standby application. The standby application creates a socket and executes the setsockopt( ) call with the socket id and the cookie to associate the two sockets on the active side and the standby side. The application may opt to call the setsockopt with SOCKET-ID-INVALID as an argument wherein the setsockopt call also internally calls socket( ) to create a new socket, before actually performing setsockopt( ). Data redundancy may also be established immediately.

In case (2), when the application 420 performs accept on the standby, then the active application 405 invokes getsockopt to obtain the cookie and ships it to the standby. But the application 420 is blocked on accept. The application on the standby is woken up with ERED so that it can obtain the message from the standby and perform the setsockopt with the cookie. The application on the standby (420) now creates a socket and performs setsockopt(SO_REDUNDANT) or calls the setsockopt(SO_REDUNDANT) with SOCKET-ID-INVALID and gets the socket id. (For non-blocking sockets, EWOULDBLOCK is returned and the application 420 can use select to check if the connection was successful.) Once the application 420 has received the ERED message, it waits for the message from 405 to get the cookie and invoke setsockopt. Accept on 404 continues to return ERED until all pending sockets are associated using setsockopt.

Once control redundancy is established as in the procedure explained above, the data redundancy may also start.

Special Scenarios

Active failure:

When the active node fails or is removed, the standby takes over seemlessly.

Standby Failure

When the standby is removed, all the redundant sockets become non-redundant. All the sockets are marked temporarily non-redundant by the socket layer on the active (415). The application can perform a getsockopt on SO-REDUNDANT STATE to find the status of redundancy. An asynchronous signal or message may be sent to the application to notify the application 405 of—this event, or the application itself detects the failure and takes appropriate actions.

Standby Introduction Scenarios

When the standby node is introduced (after the active node is in a stable state), all the redundant socket parameters are sent to the socket layer 415 on the standby by the socket layer 415 on the active (bulk-update). Now, the application 405 performs a setsockopt call on each of the sockets that it has marked redundant, gets a cookie from the socket layer, and then ships it to the application 420 on the standby. The application on the standby issues setsockopt to associate the Active and the standby sockets.

Table 1 shows extensions to the socket API, according to one embodiment of the invention.

Socket Options

TABLE 1

| | |
|---|---|
| SO-REDUNDANT | This socket option is used by the active application to enable redundancy on the socket and to obtain the cookie from the socket layer. |
| SO-REDUNDANT-STATE | The current state of redundancy. SOCKET RED OFFLINE SOCKET RED ONLINE |

Socket operations may return ERED as the ermo to the application in case the operation cannot be completed on the node due to reasons related to redundancy. The same ermo indicates different errors, based on the context. This may be extended to have multiple ermo values.

There are many conditions under which ERED may be returned. Some of these have been listed in the prior sections.

Figure 5:
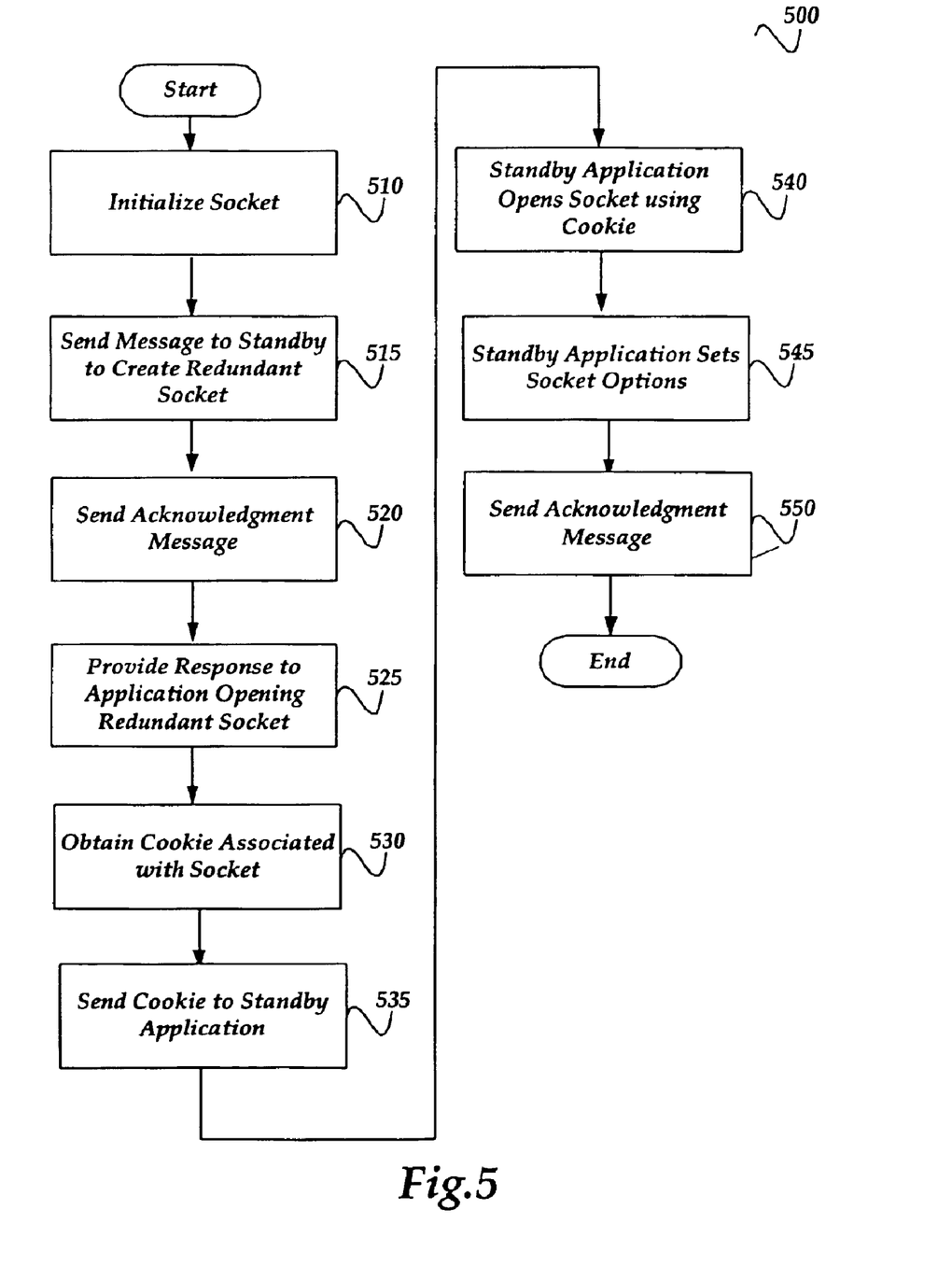
FIG. 5 illustrates a process for socket redundancy, in accordance with aspects of the invention.

FIG. 5 illustrates a process flow for a socket control redundancy procedure, in accordance with aspects of the invention. After a start block, the flow moves to block 510 where a socket is initialized (See FIG. 4, blocks 405, 415). During the initialization the socket is created and the socket options are set to be redundant. Flowing to block 515, a message is sent to the standby to create a standby (redundant) socket (See FIG. 4, block 415 to block 430). The standby socket is created with a unique identifier. According to one embodiment of the invention, the standby socket receives a cookie from the active side socket and associates the cookie with the standby socket. Transitioning to block 520, an acknowledgment message (ACK) is sent to the active side (See FIG. 4, block 430 to block 415). Next, at block 525, a response is provided to the application that opened the redundant socket (See FIG. 4, block 415 to block 405). Moving to block 530, the application request the socket operations from the newly opened socket in order to obtain the unique identifier associated with the socket (See FIG. 4, block 430). Flowing to block 535, the unique identifier is sent to a standby application (See FIG. 4, block 405 to block 420). Transitioning to block 540, the standby socket is opened using the unique identifier (See FIG. 4, block 420). The standby socket may also set socket options (block 545) (See FIG. 4, block 420 to block 430). An acknowledgment message is then sent to the active application side (block 550) (See FIG. 4, block 420 to block 405). The process then steps to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for socket redundancy, comprising:
   opening a primary socket;
   requesting a redundant socket to be opened through a socket layer associated with the primary socket and a socket layer associated with the redundant socket;
   associating the primary socket with the redundant socket and sending a message to the redundant socket that includes a unique identifier that is associated with the primary socket and the redundant socket;
   determining when the primary socket fails; and when, making the redundant socket the primary socket.

2. The method of claim 1, further comprising sending an acknowledgement message in response to the request to open the redundant socket.

3. A method for socket redundancy, comprising:
   opening a primary socket;
   requesting a redundant socket to be opened through a socket layer associated with the primary socket and a socket layer associated with the redundancy socket;
   associating the primary socket with the redundant socket and sending an application associated with the redundant socket a cookie;
   determining when the primary socket fails; and when, making the redundant socket the primary socket.

4. The method of claim 3, further comprising associating the cookie with the redundant socket.

5. The method of claim 4, further comprising providing a standard socket interface for an application.

6. The method of claim 5, wherein the standard socket interface further comprises providing a redundant socket state and an option to make the socket redundant.

7. A system for socket redundancy that provides a standard socket interface, comprising:
   an active node configured to open a primary socket, request that a redundant socket is opened, and associate the primary socket with the redundant socket; and
   a standby node configured to open the redundant socket and associate the redundant socket with the primary socket, wherein the redundant socket is configured to seamlessly act as the primary socket when the primary socket fails;
   the active node and the standby node comprising an application, a socket library, and a socket layer, wherein the socket layer for the active node is configured to request that the redundant socket be opened on the standby node and the socket layer for the active node and the socket layer for the standby node are configured to send a message relating to the creation of the redundant socket;
   wherein the message further comprises a cookie that uniquely identifies the socket.

8. The system of claim 7, wherein the redundant socket and the primary socket are associated with the cookie.

9. The system of claim 8, wherein the standby node is further configured to send an acknowledgement message to the active node in response to the request to open a redundant socket.

10. The system of claim 9, wherein the acknowledgement message is sent by the redundant socket layer to the primary socket layer.

\* \* \* \* \*

UNITED STATES PATENT AND TRADEMARK OFFICE
CERTIFICATE OF CORRECTION

PATENT NO. : 6,938,179 B2
DATED : August 30, 2005
INVENTOR(S) : Sreeram P. Iyer et al.

It is certified that error appears in the above-identified patent and that said Letters Patent is hereby corrected as shown below:

Column 7,
Line 4, delete "(ermo)" and insert -- (errno) --.

Column 8,
Line 35, after "Scenarios" insert -- : --.
Line 47, after "Options" insert -- : --.
Line 58, 60 and 62, delete "ermo" and insert -- errno --.

Column 10,
Line 5, delete "redundancy" and insert -- redundant --.

Signed and Sealed this

Twenty-seventh Day of December, 2005

JON W. DUDAS
*Director of the United States Patent and Trademark Office*